United States Patent
Zhang et al.

(10) Patent No.: US 10,479,053 B2
(45) Date of Patent: *Nov. 19, 2019

(54) COATED ARTICLE HAVING LOW-E COATING WITH IR REFLECTING LAYER(S) AND NIOBIUM-DOPED TITANIUM OXIDE DIELECTRIC LAYER(S) AND METHOD OF MAKING SAME

(71) Applicant: Guardian Glass, LLC, Auburn Hills, MI (US)

(72) Inventors: Guizhen Zhang, Auburn Hills, MI (US); Daniel Schweigert, Auburn Hills, MI (US); Guowen Ding, Auburn Hills, MI (US); Daniel Lee, Auburn Hills, MI (US); Cesar Clavero, Auburn Hills, MI (US); Scott Jewhurst, Auburn Hills, MI (US); Gaurav Saraf, Auburn Hills, MI (US); Minh Le, Auburn Hills, MI (US); Nestor P. Murphy, West Bloomfield, MI (US); Marcus Frank, Gelhausen (DE)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,250

(22) Filed: Feb. 21, 2019

(65) Prior Publication Data

US 2019/0184685 A1    Jun. 20, 2019

Related U.S. Application Data

(63) Continuation of application No. 15/908,850, filed on Mar. 1, 2018, now Pat. No. 10,213,988.

(60) Provisional application No. 62/466,474, filed on Mar. 3, 2017.

(51) Int. Cl.
*B32B 15/04* (2006.01)
*B32B 17/06* (2006.01)
(Continued)

(52) U.S. Cl.
CPC ........ *B32B 17/10036* (2013.01); *C03C 17/36* (2013.01); *C03C 17/366* (2013.01);
(Continued)

(58) Field of Classification Search
USPC .................................. 428/426, 428, 432, 434
See application file for complete search history.

(56) References Cited

U.S. PATENT DOCUMENTS

| | | | |
|---|---|---|---|
| 5,110,637 A | * | 5/1992 | Ando ...................... C03C 17/23 428/34 |
| 6,589,658 B1 | | 7/2003 | Stachowiak |

(Continued)

OTHER PUBLICATIONS

U.S. Appl. No. 15/908,850, filed Mar. 1, 2018; Zhang et al.
U.S. Appl. No. 62/466,474, filed Mar. 3, 2017; Zhang et al.
U.S. Appl. No. 15/448,739, filed Mar. 3, 2017; Zhang et al.

*Primary Examiner* — Lauren R Colgan

(57) ABSTRACT

A coated article includes a low emissivity (low-E) coating having at least one infrared (IR) reflecting layer of a material such as silver, gold, or the like, and at least one high refractive index layer of or including titanium oxide and at least one additional metal. A doped titanium oxide layer(s) is designed and deposited in a manner so as to be amorphous or substantially amorphous (as opposed to crystalline) in the low-E coating, so as to better withstand optional heat treatment (HT) such as thermal tempering and reduce haze. The high index layer may be a transparent dielectric high index layer in preferred embodiments, which may be provided for antireflection purposes and/or color adjustment purposes, in addition to having thermal stability.

14 Claims, 6 Drawing Sheets

(51) Int. Cl.
 *B32B 17/10* (2006.01)
 *C03C 17/36* (2006.01)

(52) U.S. Cl.
 CPC ...... *C03C 17/3618* (2013.01); *C03C 17/3626* (2013.01); *C03C 17/3644* (2013.01); *C03C 17/3681* (2013.01)

(56) References Cited

U.S. PATENT DOCUMENTS

| | | |
|---|---|---|
| 6,830,817 B2 | 12/2004 | Stachowiak |
| 7,005,188 B2 | 2/2006 | Anderson |
| 7,901,781 B2 * | 3/2011 | Maschwitz ....... B32B 17/10036 428/212 |
| 8,105,695 B2 | 1/2012 | Depauw |
| 9,045,363 B2 | 6/2015 | Hassan |
| 9,315,414 B2 | 4/2016 | Hassan |
| 9,371,684 B2 | 6/2016 | Butz |
| 10,196,735 B2 | 2/2019 | Zhang et al. |
| 10,213,988 B2 | 2/2019 | Zhang et al. |
| 2002/0086164 A1 | 7/2002 | Anzaki et al. |
| 2010/0167034 A1 * | 7/2010 | Depauw .................. C03C 17/36 428/216 |
| 2010/0279144 A1 | 11/2010 | Frank et al. |
| 2014/0170421 A1 | 6/2014 | Ding |
| 2014/0186598 A1 | 7/2014 | Ding |
| 2014/0308528 A1 | 10/2014 | Ding |
| 2015/0177583 A1 | 6/2015 | Ding |
| 2015/0177585 A1 | 6/2015 | Ding |

\* cited by examiner

Fig. 6

| AC-77-07 | | | AC-77-07 |
|---|---|---|---|
| Monolithic Optics (Ill 'C'; 2 deg obs) | T | Y (%) | 90.42 |
| | | a* | -1.13 |
| | | b* | 1.03 |
| | Rg | Y (%) | 5.04 |
| | | a* | 1.5 |
| | | b* | -5.42 |
| | Rf | Y (%) | 4.2 |
| | | a* | 1.46 |
| | | b* | -5.25 |
| $R_s$ (ohms/sq) | | | 3.15 |
| Normal Emissivity ($E_n$) | | | 0.046 |
| EN410 Thermal Performance | Tvis (%) | | 75.0 |
| | Tsol (%) | | 50.6 |
| | Rsol (%) | | 27.5 |
| | Asol (%) | | 21.9 |
| | Uval | | 0.615 |
| | SHGC | | 57.4 |
| | LSG | | 1.31 |

Fig. 5

| AC-77-07 | |
|---|---|
| Material | nm |
| SiAlBOx | 35 |
| Si3N4 | 16 |
| ZnAlO | 3 |
| TiNbO2 | 12 |
| NiTiNbOx | 2.5 |
| Ag | 11.4 |
| ZnAlO | 3 |
| TiNbO2 | 33 |
| Clear Glass Substrate (4mm) | |

Fig. 7

| Monolithic Optics (Ill 'C', 2 deg obs) | | | AC-77-02 | AC-77-07 |
|---|---|---|---|---|
| T | | Y (%) | 89.19 | 90.42 |
| | | a* | -1.51 | -1.13 |
| | | b* | 2.36 | 1.03 |
| Rg | | Y (%) | 5.22 | 5.04 |
| | | a* | 4.22 | 1.5 |
| | | b* | -9.49 | -5.42 |
| Rf | | Y (%) | 4.34 | 4.2 |
| | | a* | 4.18 | 1.46 |
| | | b* | -10.58 | -5.25 |
| $R_s$ (ohms/sq) | | | 4.08 | 3.15 |
| Normal Emissivity ($E_n$) | | | 0.120 | 0.046 |

COATED ARTICLE HAVING LOW-E COATING WITH IR REFLECTING LAYER(S) AND NIOBIUM-DOPED TITANIUM OXIDE DIELECTRIC LAYER(S) AND METHOD OF MAKING SAME

This application is a continuation of application Ser. No. 15/908,850, filed Mar. 1, 2018 (now U.S. Pat. No. 10,213,988), which claims priority on U.S. Provisional Application Ser. No. 62/466,474, filed Mar. 3, 2017. This application is also related to U.S. application Ser. No. 15/448,739, filed Mar. 3, 2017 (now U.S. Pat. No. 10,196,735), the entire disclosures of which are hereby incorporated herein by reference in its entireties.

This application is also related to U.S. patent application Ser. No. 15/448,739, filed Mar. 3, 2017, the entire disclosure of which is hereby incorporated herein by reference in its entirety.

This application relates to a coated article including a low emissivity (low-E) coating having at least one infrared (IR) reflecting layer of a material such as silver, gold, or the like, and at least one high refractive index layer of or including doped titanium oxide (e.g., $TiO_2$ doped with at least one additional element such as niobium or other suitable element(s)). The doped titanium oxide layer(s) is designed and deposited in a manner so as to be amorphous or substantially amorphous (as opposed to crystalline) in the low-E coating, so as to better withstand optional heat treatment (HT) such as thermal tempering. The high index layer may be a transparent dielectric high index layer in preferred embodiments, which may be provided for antireflection/transmission purposes and/or color adjustment purposes, in addition to having thermal stability. In certain example embodiments, the low-E coating may be used in applications such as monolithic or insulating glass (IG) window unit, vehicle windows, of the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like.

Conventional low-E coatings are disclosed, for example and without limitation, in U.S. Pat. Nos. 6,576,349, 9,212,417, 9,297,197, 7,390,572, 7,153,579, and 9,403,345, the disclosures of which are hereby incorporated herein by reference.

Certain low-E coating utilize at least one transparent dielectric layer of titanium oxide (e.g., $TiO_2$), which has a high refractive index (n), for antireflection and/or coloration purposes. See for example U.S. Pat. Nos. 9,212,417, 9,297,197, 7,390,572, 7,153,579, and 9,403,345. Although high refractive index dielectric materials such as $TiO_2$ are known and used in low-E coatings, these materials are not thermally stable and are typically not heat stable after tempering process of about 650 C for 8 minutes, due to film crystallization (or change in crystallinity) in as-deposited or post-tempering state, which may in turn induce thermal or lattice stress on adjacent layers in the film stack. Such stress can further cause change in physical or material properties of the stack and hence impact on the Ag layer, which results in deteriorated low E stack performance. In other words, conventional $TiO_2$ layers are typically sputter-deposited so as to realize a crystalline structure, which leads to damage to the stack upon HT as explained above.

Example embodiments of this invention solve these problems by providing a high index doped titanium oxide layer for use in low-E coatings that both has a high refractive index (n) and is substantially stable upon heat treatment (HT).

"Heat treatment" (HT) and like terms such as "heat treating" and "heat treated", such as thermal tempering, heat strengthening, and/or heat bending, as used herein means heat treating the glass substrate and coating thereon at temperature of at least 580 degrees C. for at least 5 minutes. An example heat treatment is heat treating at temperature of about 600-650 degrees C. for at least 8 minutes.

In example embodiments of this invention, a coated article includes a low emissivity (low-E) coating having at least one infrared (IR) reflecting layer of a material such as silver, gold, or the like, and at least one high refractive index dielectric layer of or including doped titanium oxide (e.g., $TiO_2$ doped with at least one additional element such as Nb, Sn, ZnSn, Y, Zr, and/or Ba). The doped titanium oxide layer(s) is designed and deposited in a manner so as to be amorphous or substantially amorphous (as opposed to crystalline) in the low-E coating, so as to better withstand optional heat treatment (HT) such as thermal tempering. For example, it has surprisingly and unexpectedly been found that sputter-depositing the doped titanium oxide layer(s) in an oxygen depleted atmosphere results in the doped titanium oxide layer being deposited in an amorphous or substantially amorphous (as opposed to crystalline) state as well as having desired transmission characteristics, which in turn allows the layer and overall coating to be much more stable upon HT. The high index layer(s) may be a transparent dielectric high index layer in preferred embodiments, which may be provided for antireflection purposes, transmission, and/or color adjustment purposes, in addition to having thermal stability. In certain example embodiments, the low-E coating may be used in applications such as monolithic or insulating glass (IG) window units, vehicle windows, or the like.

In an example embodiment of this invention, there is provided a coated article including a coating supported by a glass substrate, the coating comprising: a first transparent dielectric layer on the glass substrate; an infrared (IR) reflecting layer comprising silver on the glass substrate, located over at least the first transparent dielectric layer; a second transparent dielectric layer on the glass substrate, located over at least the IR reflecting layer; and wherein at least one of the first and second transparent dielectric layers is amorphous or substantially amorphous, and comprises an oxide of Ti doped with at least one of Nb, Sn, SnZn, Zr, Y, and Ba, and wherein metal content of the amorphous or substantially amorphous layer comprises from about 70-99.5% Ti and from about 0.5-30% of at least one of Nb, Sn, SnZn, Zr, Y, and Ba (atomic %).

In another example embodiment of this invention, there is provided a coated article including a coating supported by a glass substrate, the coating comprising: a first transparent dielectric layer on the glass substrate; an infrared (IR) reflecting layer comprising silver on the glass substrate, located over at least the first transparent dielectric layer; a second transparent dielectric layer on the glass substrate, located over at least the IR reflecting layer; and wherein at least one of the first and second transparent dielectric layers is amorphous or substantially amorphous, and comprises an oxide of Ti and Nb, and wherein metal content of the amorphous or substantially amorphous layer comprises either: (a) from about 30-70% Ti and from about 30-70% Nb (atomic %), or (b) from about 70-99.5% Ti and from about 0.5-30% of at least one of Nb, more preferably from about 80-99% Ti and from about 1-20% of at least one of Nb, and sometimes from about 87-99% Ti and from about 1-13% Nb (atomic %).

In another example embodiment of this invention, there is provided a method of making a coated article including a coating supported by a glass substrate, the method comprising: sputter depositing a first transparent dielectric layer on the glass substrate; sputter-depositing an infrared (IR) reflecting layer comprising silver on the glass substrate, located over at least the first transparent dielectric layer; sputter-depositing a second transparent dielectric layer on the glass substrate, located over at least the IR reflecting layer; and wherein at least one of the first and second transparent dielectric layers is sputter-deposited so as to be amorphous or substantially amorphous, and comprise an oxide of Ti and at least one of Nb, Sn, SnZn, Zr, Y, and Ba. The at least one of the first and second transparent dielectric layers sputter-deposited, so as to be amorphous or substantially amorphous, may be sputter-deposited in an oxygen depleted atmosphere so that a difference in radii for metals during sputtering causes lattice disorder leading to amorphous or substantially amorphous structure of the layer.

BRIEF DESCRIPTION OF THE DRAWINGS

FIG. 5 illustrates a layer stack of Example 1, which includes two high index dielectric layers of Nb-doped titanium oxide.

FIG. 6 is a chart setting forth optical/thermal data for Example 1, measured monolithically.

FIG. 7 is a chart setting forth optical/thermal data for both Example 1 and Example 2.

DETAILED DESCRIPTION OF EXAMPLE EMBODIMENTS OF THE INVENTION

Figure 1:
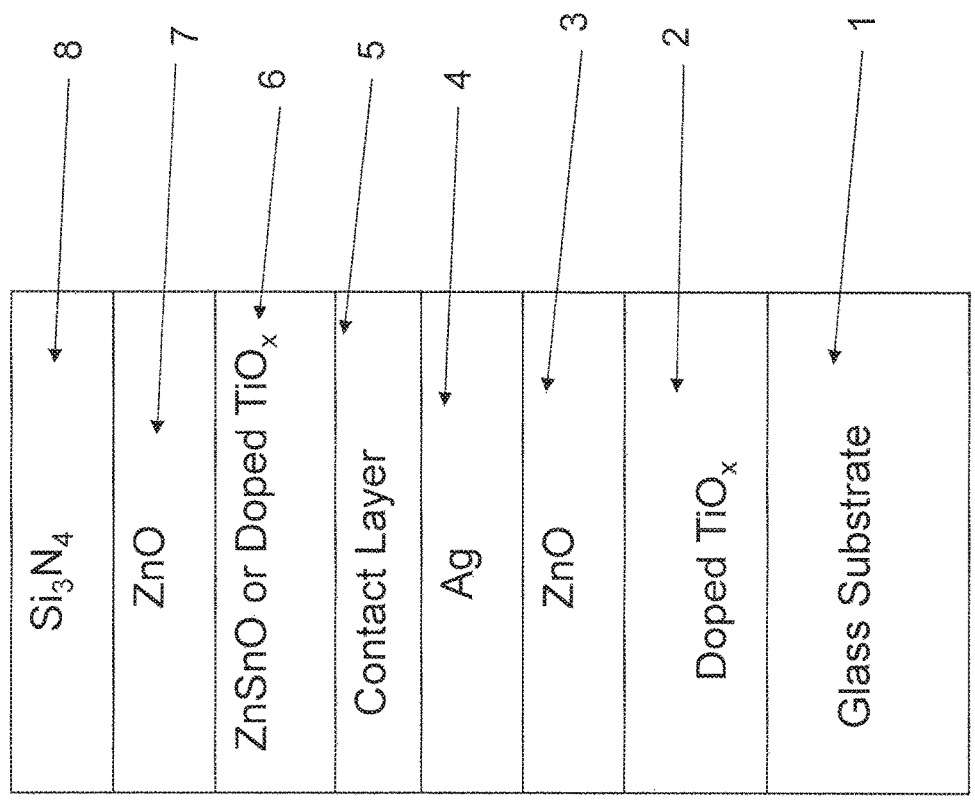
FIG. 1 is a cross sectional view of a coated article according to an example embodiment of this invention.

Referring now to the drawings in which like reference numerals indicate like parts throughout the several views.

Coated articles herein may be used in applications such as monolithic windows, IG window units such as residential windows, patio doors, vehicle windows, and/or any other suitable application that includes single or multiple substrates such as glass substrates.

High refractive index material such as $TiO_2$ with low or no light absorption in the visible range is often used in low-E coatings in window applications. However, $TiO_2$ is typically not heat stable after a thermal tempering process such as involving HT at about 650 C for 8 minutes, due to film crystallization (or change in crystallinity) in as-deposited or post-tempering state, which may in turn induce thermal or lattice stress on adjacent layers in the film stack. Such a stress can further cause change in physical or material properties of the stack and hence impact on the IR reflecting Ag based layer, which results in deteriorated low E stack performance.

Example embodiments of this invention provide for a high index doped titanium oxide dielectric layer(s) designed to suppress crystallinity, irrespective of HT conditions such as thermal tempering. A high index doped titanium oxide dielectric layer 2 for use in low-E coatings is provided that has a high refractive index (n) and is amorphous or substantially amorphous and thus substantially stable upon heat treatment (HT). In example embodiments of this invention, a coated article includes a low emissivity (low-E) coating having at least one infrared (IR) reflecting layer 4 of a material such as silver, gold, or the like, and at least one high refractive index dielectric layer 2 (and possibly 6) of or including doped titanium oxide (e.g., $TiO_2$) doped with at least one additional element such as Nb, Sn, ZnSn, Y, Zr, and/or Ba).

The doped titanium oxide layer(s) 2 (and possibly 6) is designed and deposited in a manner so as to be amorphous or substantially amorphous (as opposed to crystalline) in the low-E coating, so as to better withstand optional heat treatment (HT) such as thermal tempering. It has been found that sputter-depositing the doped titanium oxide layer(s) 2, 6 in an oxygen depleted atmosphere results in the doped titanium oxide layer 2, 6 being deposited in an amorphous or substantially amorphous (as opposed to crystalline) state and having desirable transmission characteristics, which in turn surprisingly and unexpectedly allows the layer and overall coating to be more stable upon HT.

It has been found that the difference in atomic radii between Ti and its dopant(s) (e.g., between Ti and Sn, or Ti and Ba, or Ti and Y, etc.) can be enhanced and adjusted by changing the oxidation states of both atoms by reducing oxygen content in the sputtering gas atmosphere used when sputter-depositing the layer, and this oxygen depletion in the sputtering atmosphere causes a lattice disorder (e.g., disruption in the lattice formation) and impedes the formation of crystals in the deposited doped titanium oxide layer, thereby leading to amorphous or substantially amorphous structure for sputter deposited layer(s) 2, 6 which is stable even at high temperature thermal tempering. A large difference in ionic radii of Ti and dopant ions can disrupt the lattice and impede crystalline growth of the compound. The ionic radii depend on oxidation state and coordination number. Low oxygen conditions in the sputtering gaseous atmosphere force Ti into a lower oxidation state and/or lower coordination which in turn results in a larger difference in ionic radii with the dopant (e.g., Sn, SnZn, Ba, or Y). As a result, the doped titanium oxide layer(s) 2, 6 sputter-deposited in an oxygen depleted atmosphere is deposited in an amorphous or substantially amorphous state due for example to the large difference in ionic radii and lattice disruption and thus has thermal stability upon optional HT such as thermal tempering or heat bending. Doped titanium oxide layer 2 (and/or 6) may be substoichiometric in certain example embodiments of this invention, so as to be only partially oxided, due to the oxygen depletion used when depositing the layer 2 (and/or 6), or may optionally be fully oxided in certain example embodiments. The high index layer(s) 2, 6 may be a dielectric high index layer in preferred embodiments, which may be provided for antireflection purposes, transmission, and/or color adjustment purposes, in addition to having thermal stability. In certain example embodiments, the low-E coating may be used in applications such as monolithic or insulating glass (IG) window units, vehicle windows, or the like.

"Substantially amorphous" as used herein means majority amorphous, and more amorphous than crystalline. For instance, "substantially amorphous" includes at least 60% amorphous, at least 80% amorphous, at least 90% amorphous, and fully amorphous. The amorphous or substantially amorphous high index doped titanium oxide layer(s) 2, 6 may be a transparent dielectric high index layer, and may be oxided and/or nitrided, in preferred embodiments, and is provided for antireflection purposes and/or color adjustment purposes, in addition to having thermal stability. When the doped titanium oxide layer(s) 2, 6 is/are nitride, it is preferably that the nitrogen content be small such as from 0-10%, more preferably from 0-5% (atomic %).

Thus, doped titanium oxide layer 2 (and possibly 6) discussed herein may be sputter-deposited in an oxygen depleted atmosphere in order to realize and amorphous or substantially amorphous sputter deposited layer. In certain example embodiments of this invention, no more than 50% of the gaseous atmosphere in which the doped titanium oxide layer 2 (and possibly 6) is sputter deposited is made up of oxygen gas, more preferably no more than 40%, even more preferably no more than 35%, and most preferably no more than 25%. The remainder of the gas in the atmosphere may be an inert gas such as argon gas, or the like. For example, an example 20% oxygen atmosphere in the sputtering chamber(s) is made up of 20% oxygen gas and 80% argon gas. Small amounts of other gas may also be included, intentionally or unintentionally.

FIG. 1 is a cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick), and a multi-layer coating (or layer system) provided on the substrate 1 either directly or indirectly. As shown in FIG. 1, the example low-E coating may be of or include high index amorphous or substantially amorphous transparent dielectric layer 2 based on doped titanium oxide as discussed herein, zinc oxide and/or zinc stannate inclusive contact layer 3 (e.g., $ZnO_x$ where "x" may be about 1; or $ZnAlO_x$), IR (infrared) reflecting layer 4 including or of silver, gold, or the like, upper contact layer 5 of or including an oxide of Ni and/or Cr (e.g., $NiCrO_x$) or other suitable material, and a dielectric overcoat of or including dielectric layer 6 that may be a medium index layer such as zinc oxide or zinc stannate, or may be a high index layer such as the doped titanium oxide discussed herein, optional medium index layer 7 of or including zinc oxide, tin oxide, and/or zinc stannate or other suitable material, and dielectric layer 8 of or including silicon nitride and/or silicon oxynitride or other suitable material. The silicon nitride inclusive layers (e.g., layer 8) may further include Al, oxygen, or the like, and the zinc oxide based layers may also include tin and/or aluminum. Other layers and/or materials may also be provided in the coating in certain example embodiments of this invention, and it is also possible that certain layers may be removed or split in certain example instances. For example, a zirconium oxide layer or an $AlSiBO_x$ layer (not shown) could be provided directly over and contacting silicon nitride layer 8. As another example, a medium index layer such as silicon nitride could be provided between the glass substrate 1 and high index layer 2. As another example, two silver based IR reflecting layers, spaced apart by a dielectric layer stack including tin oxide for instance, may be provided and the overcoat and/or undercoat of FIG. 1 may be used therein. Moreover, one or more of the layers discussed above may be doped with other materials in certain example embodiments of this invention. This invention is not limited to the layer stack shown in FIG. 1, as the FIG. 1 stack is provided for purposes of example only in order to illustrate an example location(s) for a high index doped titanium oxide layer(s) 2 and/or 6 discussed herein.

In monolithic instances, the coated article includes only one substrate such as glass substrate 1 (see FIG. 1). However, monolithic coated articles herein may be used in devices such as IG window units for example. Typically, an IG window unit may include two or more spaced apart substrates with an air gap defined therebetween. Example IG window units are illustrated and described, for example, in U.S. Pat. Nos. 5,770,321, 5,800,933, 6,524,714, 6,541,084 and US 2003/0150711, the disclosures of which are all hereby incorporated herein by reference. For example, the coated glass substrate shown in FIG. 1 may be coupled to another glass substrate via spacer(s), sealant(s) or the like with a gap being defined therebetween in an IG window unit. In certain example instances, the coating may be provided on the side of the glass substrate 1 facing the gap, i.e., surface #2 or surface #3. In other example embodiments, the IG window unit may include additional glass sheets (e.g., the IG unit may include three spaced apart glass sheets instead of two).

High index transparent dielectric layer 2 (and layer 6 when of doped titanium oxide discussed herein) preferably has a refractive index (n, measured at 550 nm) of at least 2.12, more preferably of at least 2.20, more preferably of at least 2.25. These layers may optionally include a small amount of nitrogen such as no greater than 15%, more preferably no greater than 10%, and most preferably no greater than 5% nitrogen (atomic %). Titanium oxide (e.g., $TiO_2$) is sputter deposited so as to be crystalline under normal sputtering conditions which involve high oxygen gas content. However, crystalline titanium oxide layers in low-E coatings are problematic because they are unstable upon HT such as thermal tempering.

High index transparent dielectric layer 2 (and layer 6 when of doped titanium oxide discussed herein) is based on titanium oxide and preferably includes titanium oxide (e.g., $TiO_2$ or $TiO_x$ where x is from 1.5 to 2.0, possibly from 1.6 to 1.97) doped with one or more of Nb, Sn, ZnSn, Y, Zr, and/or Ba. In certain example embodiments of this invention, doped titanium oxide layer 2 and/or 6 has a metal content of from about 70-99.5% Ti, more preferably from about 80-99% Ti, still more preferably from about 87-99% Ti, and from about 0.5 to 30% dopant, more preferably from about 1-20% dopant, and most preferably from about 1-13% dopant (atomic %), where the dopant is of or includes one or more of Nb, Sn, ZnSn, Y, Zr, and/or Ba. It has been found that these dopant amounts suffice for providing sufficient lattice mismatch upon oxygen depletion discussed herein, and also are low enough to allow the layer to have sufficiently high refractive index (n).

Transparent dielectric lower contact layer 3 may be of or include zinc oxide (e.g., ZnO), zinc stannate, or other suitable material. The zinc oxide of layer 3 may contain other materials as well such as Al (e.g., to form $ZnAlO_x$) or Sn in certain example embodiments. For example, in certain example embodiments of this invention, zinc oxide layer 3 may be doped with from about 1 to 10% Al (or B), more preferably from about 1 to 5% Al (or B), and most preferably about 2 to 4% Al (or B). The use of zinc oxide 3 under the silver in layer 4 allows for an excellent quality of silver to be achieved. Zinc oxide layer 3 is typically deposited in a crystalline state. In certain example embodiments (e.g., to be discussed below) the zinc oxide inclusive layer 3 may be formed via sputtering a ceramic ZnO or metal rotatable magnetron sputtering target.

Infrared (IR) reflecting layer 4 is preferably substantially or entirely metallic and/or conductive, and may comprise or consist essentially of silver (Ag), gold, or any other suitable IR reflecting material. The silver of IR reflecting layer 4 may be doped with other material(s), such as with Pd, Zn, or Cu, in certain example embodiments. IR reflecting layer 4 helps allow the coating to have low-E and/or good solar control characteristics such as low emittance, low sheet resistance, and so forth. The IR reflecting layer may, however, be slightly oxidized in certain embodiments of this invention. Multiple silver based IR reflecting layers 4 may be provided, spaced apart in low-E coating by at least one dielectric layer, in double or triple silver stacks including doped titanium oxide layers discussed herein in certain example embodiments of this invention.

Upper contact layer 5 is located over and directly contacting the IR reflecting layer 4, and may be of or include an oxide of Ni and/or Cr in certain example embodiments. In certain example embodiments, upper contact layer 5 may be of or include nickel (Ni) oxide, chromium/chrome (Cr) oxide, or a nickel alloy oxide such as nickel chrome oxide ($NiCrO_x$), or other suitable material(s) such as $NiCrMoO_x$, NiCrMo, Ti, $NiTiNbO_x$, $TiO_x$, metallic NiCr, or the like. Contact layer 5 may or may not be oxidation graded in different embodiments of this invention. Oxidation grading means that the degree of oxidation in the layer changes through the thickness of the layer so that for example a contact layer may be graded so as to be less oxidized at the contact interface with the immediately adjacent IR reflecting layer 4 than at a portion of the contact layer further or more/most distant from the immediately adjacent IR reflecting layer. Contact layer 5 may or may not be continuous in different embodiments of this invention across the entire IR reflecting layer 4.

Other layer(s) below or above the illustrated FIG. 1 coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 2 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. For example and without limitation, silicon nitride layer 5 may be removed.

While various thicknesses may be used in different embodiments of this invention, example thicknesses and materials for the respective layers on the glass substrate 1 in the FIG. 1 embodiment may be as follows, from the glass substrate outwardly (e.g., the Al content in the zinc oxide layer and the silicon nitride layers may be from about 1-10%, more preferably from about 1-5% in certain example instances). Thickness are in units of angstroms (Å).

TABLE 1

(Example Materials/Thicknesses; FIG. 1 Embodiment)

| Layer | Preferred Range (Å) | More Preferred (Å) | Example (Å) |
|---|---|---|---|
| Doped $TiO_x$ (layer 2) | 40-500 Å | 150-350 Å | 270 Å |
| ZnO or $ZnAlO_x$ (layer 3) | 10-240 Å | 35-120 Å | 40 Å |
| Ag (layer 4) | 40-160 Å | 65-125 Å | 110 Å |
| Contact (layer 5) | 10-70 Å | 20-50 Å | 34 Å |
| ZnSnO/doped $TiO_x$ (layer 6) | 30-350 Å | 80-200 Å | 100 Å |
| ZnO or $ZnAlO_x$ (layer 7) | 10-240 Å | 35-120 Å | 40 Å |
| $Si_xN_y$ (layer 8) | 50-250 Å | 80-180 Å | 100 Å |

In certain example embodiments of this invention, coated articles herein (e.g., see FIG. 1) may have the following low-E (low emissivity), solar and/or optical characteristics set forth in Table 2 when measured monolithically.

TABLE 2

Low-E/Solar Characteristics (Monolithic)

| Characteristic | General | More Preferred | Most Preferred |
|---|---|---|---|
| $R_s$ (ohms/sq.): | <=11.0 | <=10 | <=9 |
| $E_n$: | <=0.2 | <=0.15 | <=0.10 |
| $T_{vis}$ (%): | >=50 | >=60 | >=70 |

While high index transparent dielectric doped titanium oxide layer 2 (and possibly 6) is shown and described in connection with the low-E coating of FIG. 1 above, this invention is not so limited. Doped titanium oxide high index transparent dielectric layers (e.g., layer 2) described herein may be used as a high index layer(s) in any suitable low-E coating either above or below an IR reflecting layer(s). One or more of such doped titanium oxide layers 2 may be provided in any suitable low-E coating. For example and without limitation, amorphous or substantially amorphous doped titanium oxide layer 2 as described above and/or herein may be used to replace any high index (e.g., $TiO_x$ or $TiO_2$) layer in any of the low-E coatings in any of U.S. Pat. Nos. 9,212,417, 9,297,197, 7,390,572, 7,153,579, 9,365, 450, and 9,403,345, all of which are incorporated herein by reference.

Figure 2:
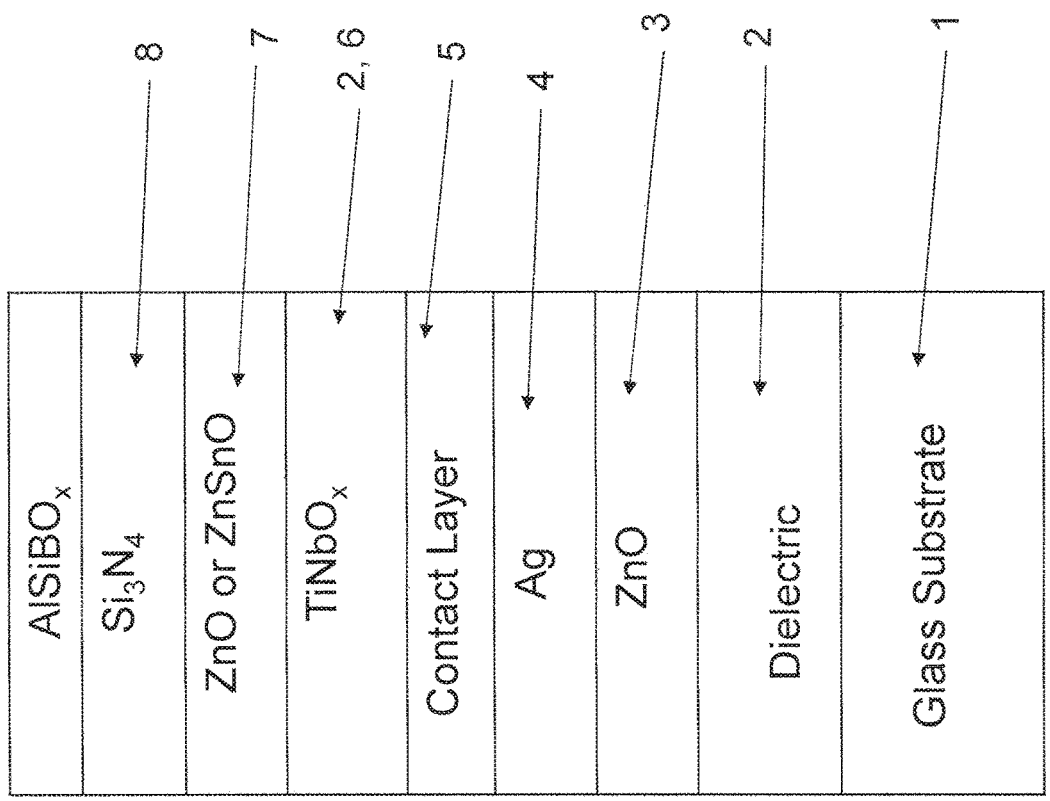
FIG. 2 is a cross sectional view of a coated article according to another example embodiment of this invention.

FIG. 2 is a cross sectional view of a coated article according to another example embodiment of this invention. Layers 2-8 are the same as layers 2-8 described above, with FIG. 2 illustrating for example an Nb-doped $TiO_x$ layer (e.g., $TiNbO_2$) layer for use as a high index layer 2, 6 in the overcoat, as well as a capping layer of or including $AlSiBO_x$.

Figure 4:
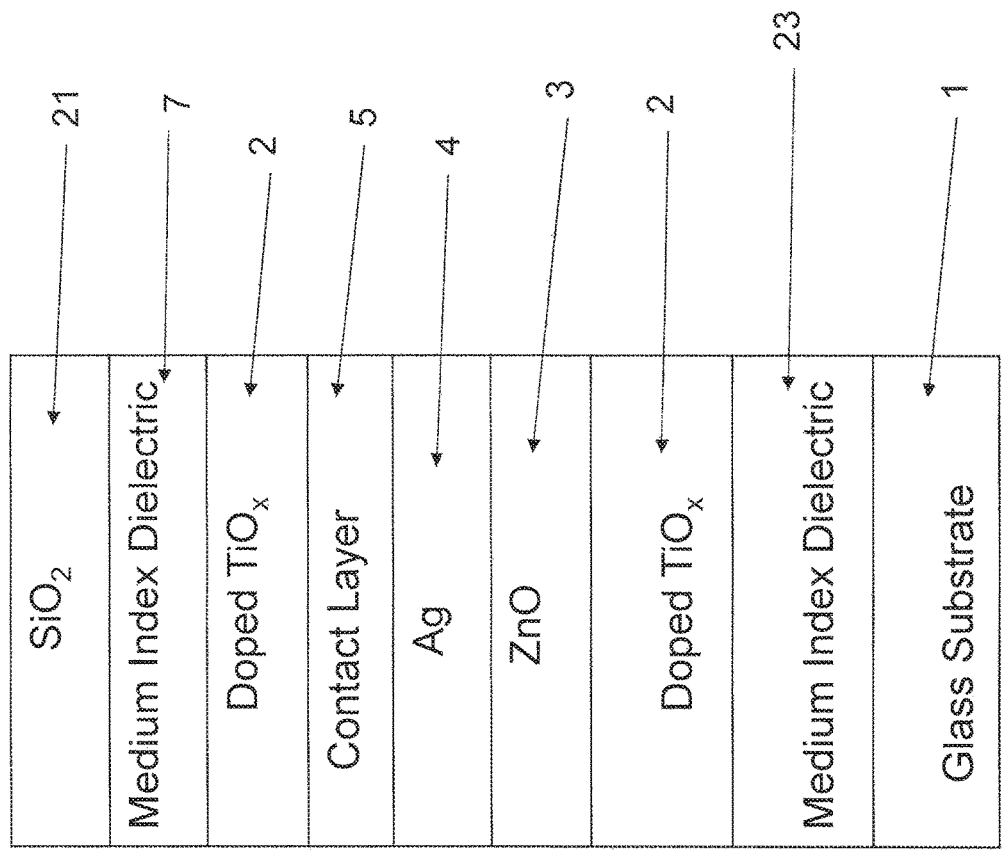
FIG. 4 is a cross sectional view of a coated article according to another example embodiment of this invention.

FIG. 4 is a cross sectional view of a coated article according to another example embodiment of this invention. FIG. 4 is similar to FIG. 1, except that in the FIG. 4 embodiment a medium index (n) layer 23 of or including material such as silicon nitride or zinc oxide is provided between and directly contacting the glass substrate 1 and the doped titanium oxide layer 2, and a low index layer 21 of a material such as $SiO_2$ is provided in place of layer 8. It is noted that doped titanium oxide as discussed herein is used for the layer immediately above contact layer 5 in the FIG. 4 embodiment.

Window coating with high transmission and high solar gain (high SGHC value) is achieved throughput a novel overcoat design such as that shown in FIG. 2 with a combination of . . . $TiNbO_x$/ZnO or SnZnO/Ag/contact such as NiTiNb/TiNbO$_x$/Si$_3$N$_4$/AlBSiOx. It has been found that this stack can be thermally tempered after coating, which is a significant benefit compared to those films that cannot practically tempered, such as those with high index layers of TiO$_2$. High solar gain co-efficient (SHGC) low-e coating glass is desired in cold climates.

A layer stack of Example 1 according to an example embodiment of this invention is shown in FIG. 5, with the layer stack including two layers of Nb-doped TiO$_2$. It has been found that this stack is heat treatable and can achieved good optical and thermal performance in low-E applications such as monolithic and IG window applications.

FIG. 6 is a chart setting forth optical/thermal characteristics of the Example 1 FIG. 5 layer stack. It can be seen that the coated article achieves a combination of high visible transmission, substantially neutral color, low emissivity, heat treatability, and high SHGC and LSG values. In certain example embodiments of this invention, it may be desired for the coated article to achieve an SHGC value of at least 53, more preferably at least 55, more preferably of at least 57. Excellent performance is directly related to TiNbO$_x$ materials: If TiNbO$_x$ is replaced by ZnSnO or Si$_3$N$_4$, the performance suffers with a drop in Tvis (visible transmission) and SHGC. Moreover, Example 1 is thermally temperable.

The unique overcoat TiNbO$_x$/ZnO/Si$_3$N$_4$/AlSiBO$_x$ is advantageous. Without the ZnO in the overcoat, the absorption showed a 2% increase, and Tvis showed 2% reduced. And if ZnO replaces Si$_3$N$_4$, the film was changed to bad performance after the tempering process, including emissivity going up due to HT and visible transmission going down due to HT. Thus, the combination of the TiNbO$_x$/ZnO/Si$_3$N$_4$ portion of the overcoat is surprisingly advantageous. With AlSiBO$_x$ as a capping layer, the SHGC increased from 56 to 57%. Thus, this capping layer was also found to be unexpectedly beneficial.

Figure 3:
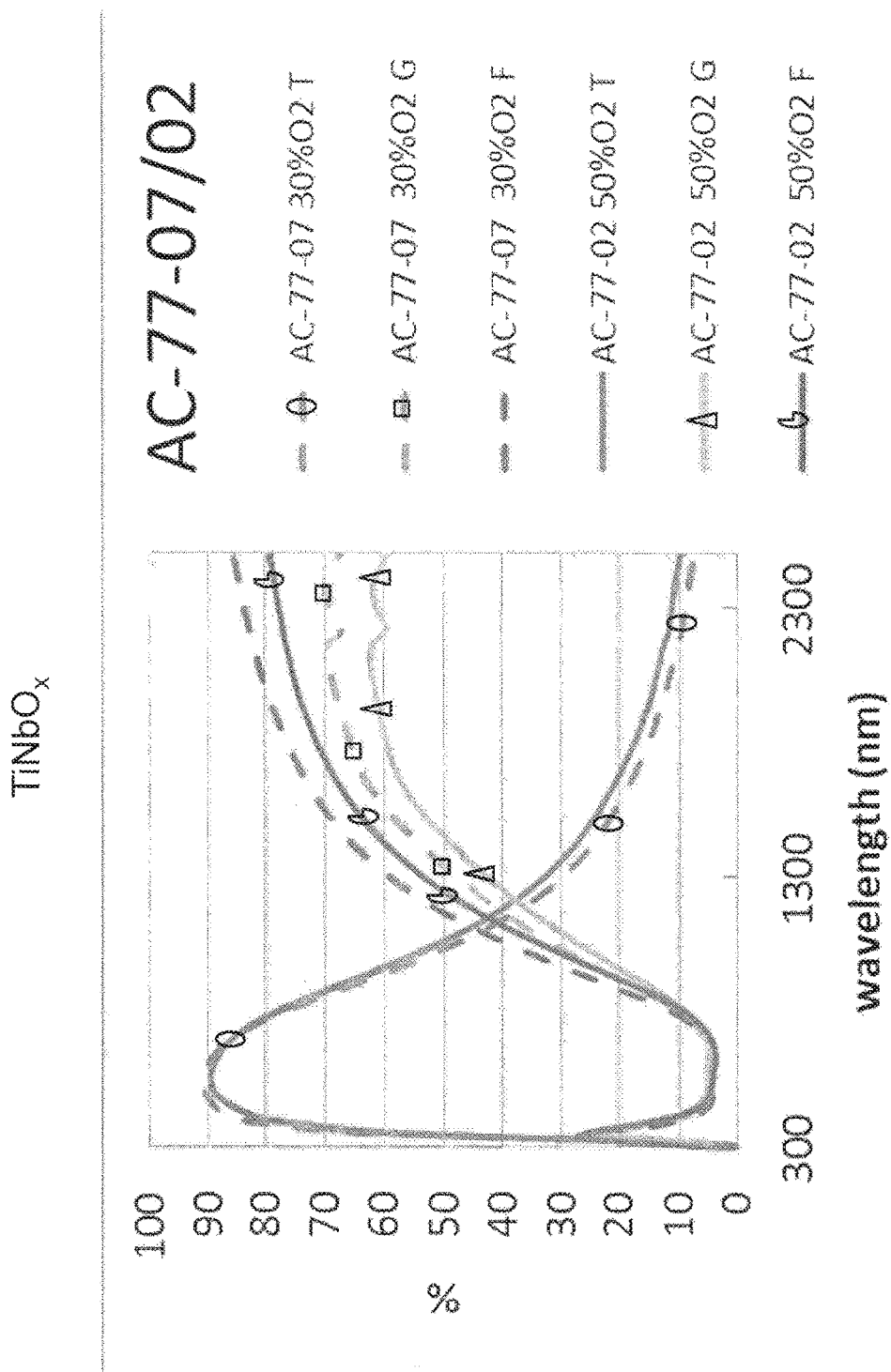
FIG. 3 is a percentage (%) versus wavelength (nm) graph plotting transmission (T) %, glass side reflection (G) %, and film side reflection (F) % of a layer stack including a high index Nb-doped titanium oxide layer versus wavelength (nm) in as-coated (AC) states for different oxygen gas content (30% vs. 50%) in the chamber in which the Nb-doped titanium oxide layer was sputter-deposited.

It has also been found that the sputter deposition process for TiNbO$_x$ should be in a particular oxygen gas content range. In particular, it has been found that an oxygen depleted atmosphere is best, with best ranges being from 20-60% oxygen gas in the sputtering chamber atmosphere, more preferably from 25-40%. In experiments 30% O$_2$ flow when depositing TiNbO$_x$ is an optimized condition. When oxygen gas content in the sputtering atmosphere is too low (e.g., lower than 20%), the TiNbO$_x$ is more like metal and there is high absorption so that the transmission will be too low. On the other hand, when the oxygen gas content in the sputtering chamber is too high such as 50% or higher, the transmission will be reduced and the emissivity will be higher, and reflection at the IR region will be lower, and those are all undesirable performance in the window coating. In this respect, FIG. 3 is a percentage (%) versus wavelength (nm) graph plotting transmission (T) %, glass side reflection (G) %, and film side reflection (F) % of a layer stack including a high index Nb-doped titanium oxide layer versus wavelength (nm) in as-coated (AC) states for different oxygen gas content (30% vs. 50%) in the chamber in which the Nb-doped titanium oxide layer was sputter-deposited. The optical results for these examples are set forth and compared in FIG. 7.

In an example embodiment of this invention, there is provided a coated article including a coating supported by a glass substrate, the coating comprising: a first transparent dielectric layer on the glass substrate; an infrared (IR) reflecting layer comprising silver on the glass substrate, located over at least the first transparent dielectric layer; a second transparent dielectric layer on the glass substrate, located over at least the IR reflecting layer; and wherein at least one of the first and second transparent dielectric layers is amorphous or substantially amorphous, and comprises an oxide of Ti doped with at least one of Nb, Sn, SnZn, Zr, Y, and Ba, and wherein metal content of the amorphous or substantially amorphous layer comprises from about 70-99.5% Ti and from about 0.5-30% of at least one of Nb, Sn, SnZn, Zr, Y, and Ba (atomic %).

In the coated article of the immediately preceding paragraph, metal content of the amorphous or substantially amorphous layer may comprise from about 80-99% Ti and from about 1-20% of at least one of Nb, Sn, SnZn, Zr, Y, and Ba (atomic %).

In the coated article of any of the preceding two paragraphs, metal content of the amorphous or substantially amorphous layer may comprise from about 87-99% Ti and from about 1-13% of at least one of Nb, Sn, SnZn, Zr, Y, and Ba (atomic %).

In the coated article of any of the preceding three paragraphs, the amorphous or substantially amorphous layer may have a refractive index (n) of at least 2.12, more preferably of at least 2.20, and most preferably of at least 2.25 (at 550 nm).

In the coated article of any of the preceding four paragraphs, the coating may be a low-E coating and have a normal emissivity (E$_n$) of no greater than 0.2, more preferably no greater than 0.10.

In the coated article of any of the preceding five paragraphs, the amorphous or substantially amorphous layer may comprise one or more of: (i) an oxide of Ti and Sn, and a metal content of from about 70-99.5% Ti and from about 0.5-30% Sn (atomic %), which map optionally further comprise Zn; (ii) an oxide of Ti and Sn, and a metal content comprising from about 80-99% Ti and from about 1-20% Sn (atomic %); (iii) an oxide of Ti, Sn, and Zn; (iv) an oxide of Ti and Y, and a metal content comprising from about 70-99.5% Ti and from about 0.5-30% Y (atomic %), more preferably from about 80-99% Ti and from about 1-20% Y (atomic %); (v) an oxide of Ti and Ba, and a metal content comprising from about 70-99.5% Ti and from about 0.5-30% Ba (atomic %), more preferably from about 80-99% Ti and from about 1-20% Ba (atomic %); (vi) an oxide of Ti and Zr, and a metal content comprising from about 70-99.5% Ti and from about 0.5-30% Zr (atomic %), more preferably from about 80-99% Ti and from about 1-20% Zr (atomic %); and/or (vii) an oxide of Ti and Nb, and a metal content comprising from about 70-99.5% Ti and from about 0.5-30% Nb (atomic %), more preferably from about 80-99% Nb and from about 1-20% Nb (atomic %).

In the coated article of any of the preceding six paragraphs, the first dielectric layer may be said amorphous or substantially amorphous layer and is located between the glass substrate and the IR reflecting layer, and may be in direct contact with the glass substrate.

In the coated article of any of the preceding seven paragraphs, the coating may comprise an overcoat including a layer comprising silicon nitride.

In the coated article of any of the preceding eight paragraphs, the coating may further comprise a layer comprising silicon nitride located between at least the glass substrate and the first transparent dielectric layer.

In the coated article of any of the preceding nine paragraphs, the coating may further comprise a layer comprising zinc oxide and/or zinc stannate located under and directly contacting the IR reflecting layer.

In the coated article of any of the preceding ten paragraphs, the coating may further comprise a layer comprising an oxide of Ni and/or Cr located over and directly contacting the IR reflecting layer.

In the coated article of any of the preceding eleven paragraphs, the coated article may be thermally tempered.

In the coated article of any of the preceding twelve paragraphs, the coated article may have a visible transmission of at least 50%, more preferably of at least 60%, and even more preferably of at least 70%, and even more preferably of at least 80% or at least 85% (e.g., measured monolithically).

The coated article of any of the preceding thirteen paragraphs may be made by a method comprising sputter depositing the first transparent dielectric layer on the glass substrate; sputter-depositing the infrared (IR) reflecting layer comprising silver on the glass substrate, located over at least the first transparent dielectric layer; sputter-depositing the second transparent dielectric layer on the glass substrate, located over at least the IR reflecting layer; and wherein at least one of the first and second transparent dielectric layers is sputter-deposited in a manner, via metal or ceramic target(s), so as to be amorphous or substantially amorphous, and comprise an oxide of Ti and at least one of Nb. Sn, SnZn, Zr, Y, and Ba. In the method, the at least one of the first and second transparent dielectric layers may be sputter-deposited, so as to be amorphous or substantially amorphous, in an oxygen depleted atmosphere so that a difference in ionic radii for metals during sputtering causes lattice disorder leading to amorphous or substantially amorphous structure of the layer. During sputter depositing the amorphous or substantially amorphous layer, oxygen during the sputter depositing may be controlled, via control oxygen gas in the sputtering atmosphere and/or oxygen in sputtering target material, so as to cause an average difference of at least 15 pm (more preferably of at least 20 pm) in ionic radii between Ti and a dopant metal and thus a lattice disorder leading to amorphous or substantially amorphous structure of the layer being sputter deposited. During sputter depositing the amorphous or substantially amorphous layer comprising an oxide of Ti and at least one of Nb, Sn, SnZn, Zr, Y, and Ba, the sputtering atmosphere may be controlled so as to contain no more than 50% oxygen gas, more preferably no more than 40% oxygen gas, and most preferably no more than 35% oxygen gas, and a remainder of the gas may be argon gas and/or any other suitable gas.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
   a first transparent dielectric layer on the glass substrate;
   an infrared (IR) reflecting layer comprising silver on the glass substrate, located over at least the first transparent dielectric layer;
   a second transparent dielectric layer on the glass substrate, located over at least the IR reflecting layer;
   wherein at least one of the first and second transparent dielectric layers is amorphous or substantially amorphous, and comprises an oxide of Ti doped with at least one of Sn, SnZn, and Ba, and wherein metal content of the amorphous or substantially amorphous layer comprises from about 70-99.5% Ti and from about 0.5-30% of at least one of Sn, SnZn, and Ba (atomic %).

2. The coated article of claim 1, wherein metal content of the amorphous or substantially amorphous layer comprises from about 80-99% Ti and from about 1-20% of at least one of Sn, SnZn, and Ba (atomic %).

3. The coated article of claim 1, wherein metal content of the amorphous or substantially amorphous layer comprises from about 87-99% Ti and from about 1-13% of at least one of Sn, SnZn, and Ba (atomic %).

4. The coated article of claim 1, wherein the amorphous or substantially amorphous layer has a refractive index (n) of at least 2.12.

5. The coated article of claim 1, wherein the amorphous or substantially amorphous layer has a refractive index (n) of at least 2.20.

6. The coated article of claim 1, wherein the coating is a low-E coating and has a normal emissivity ($E_n$) of no greater than 0.2.

7. The coated article of claim 1, wherein the first dielectric layer is said amorphous or substantially amorphous layer and is located between the glass substrate and the IR reflecting layer.

8. The coated article of claim 1, wherein the coating comprises an overcoat including a layer comprising silicon nitride.

9. The coated article of claim 1, wherein the coating further comprises a layer comprising silicon nitride located between at least the glass substrate and the first transparent dielectric layer.

10. The coated article of claim 1, wherein the coating further comprises a layer comprising zinc oxide located under and directly contacting the IR reflecting layer.

11. The coated article of claim 1, wherein the coating further comprises a layer comprising an oxide of Ni and/or Cr located over and directly contacting the IR reflecting layer.

12. The coated article of claim 1, wherein the coated article is thermally tempered.

13. The coated article of claim 1, wherein the coated article has a visible transmission of at least 50%.

14. The coated article of claim 1, wherein the coating comprises an overcoat provided over the IR reflecting layer comprising silver, the overcoat comprising a layer comprising $TiZrO_x$, a layer comprising zinc oxide, and a layer comprising silicon nitride, wherein the layer comprising zinc oxide is located between and directly contacting the layer comprising $TiZrO_x$ and the layer comprising silicon nitride.

* * * * *